(12) United States Patent
Shimizu et al.

(10) Patent No.: US 8,993,659 B2
(45) Date of Patent: Mar. 31, 2015

(54) RUBBER COMPOSITION AND PNEUMATIC TIRE

(75) Inventors: Katsunori Shimizu, Hiratsuka (JP); Satoshi Mihara, Hiratsuka (JP)

(73) Assignee: The Yokohama Rubber Company, Limited, Tokyo (JP)

( * ) Notice: Subject to any disclaimer, the term of this patent is extended or adjusted under 35 U.S.C. 154(b) by 0 days.

(21) Appl. No.: 13/879,434

(22) PCT Filed: Sep. 26, 2011

(86) PCT No.: PCT/JP2011/071797
§ 371 (c)(1),
(2), (4) Date: Jun. 21, 2013

(87) PCT Pub. No.: WO2012/049959
PCT Pub. Date: Apr. 19, 2012

(65) Prior Publication Data
US 2014/0155524 A1    Jun. 5, 2014

(30) Foreign Application Priority Data
Oct. 15, 2010  (JP) ................................ 2010-232602

(51) Int. Cl.
| | | |
|---|---|---|
| C08K 5/548 | (2006.01) | |
| C08K 5/3475 | (2006.01) | |
| B60C 1/00 | (2006.01) | |
| C08K 3/36 | (2006.01) | |
| C08K 5/34 | (2006.01) | |
| C08K 5/3417 | (2006.01) | |
| C08K 5/3447 | (2006.01) | |
| C08L 21/00 | (2006.01) | |

(52) U.S. Cl.
CPC ............ *C08K 5/3417* (2013.01); *B60C 1/0016* (2013.04); *B60C 1/0025* (2013.04); *C08K 3/36* (2013.01); *C08K 5/34* (2013.01); *C08K 5/3447* (2013.01); *C08K 5/3475* (2013.01); *C08K 5/548* (2013.01); *C08L 21/00* (2013.01)

USPC ................... 524/91; 524/94; 524/92; 524/93

(58) Field of Classification Search
USPC ........................... 524/91, 92, 93, 94
See application file for complete search history.

(56) References Cited

U.S. PATENT DOCUMENTS

| | | | | |
|---|---|---|---|---|
| 6,014,998 | A | * | 1/2000 | Mowdood et al. ............ 152/564 |
| 7,795,356 | B2 | | 9/2010 | Mihara et al. |
| 2009/0258989 | A1 | | 10/2009 | Mihara et al. |

FOREIGN PATENT DOCUMENTS

| | | |
|---|---|---|
| JP | 2000-026661 | 1/2000 |
| JP | 2003-147126 | 5/2003 |
| JP | 2006-213819 | 8/2006 |
| JP | 2007-099896 | 4/2007 |
| JP | 2009-185236 | 8/2009 |
| JP | 2009-256439 | 11/2009 |
| JP | 2009-263584 | 11/2009 |

OTHER PUBLICATIONS

International Search Report dated Dec. 20, 2011 filed in PCT/JP2011/071797.

* cited by examiner

*Primary Examiner* — Robert D. Harlan
(74) *Attorney, Agent, or Firm* — Rankin, Hill & Clark LLP

(57) ABSTRACT

A rubber composition contains diene-based rubber, silica, a sulfur-containing silane coupling agent, and an amine compound. The amine compound is indole, indigo, and derivatives thereof each of which is represented by a predetermined formula. The content of the silica is 20 to 120 parts by mass based on 100 parts by mass of the diene-based rubber. The content of the sulfur-containing silane coupling agent is 3 to 15 parts by mass based on 100 parts by mass of the silica. The content of the amine compound is 0.5 to 20 parts by mass based on 100 parts by mass of the silica. By the use of the rubber composition with this composition, a tire having improved dispersibility of silica, excellent wet performance, and excellent rolling resistance and showing a suppressed decrease in reinforcing property can be produced.

20 Claims, 1 Drawing Sheet

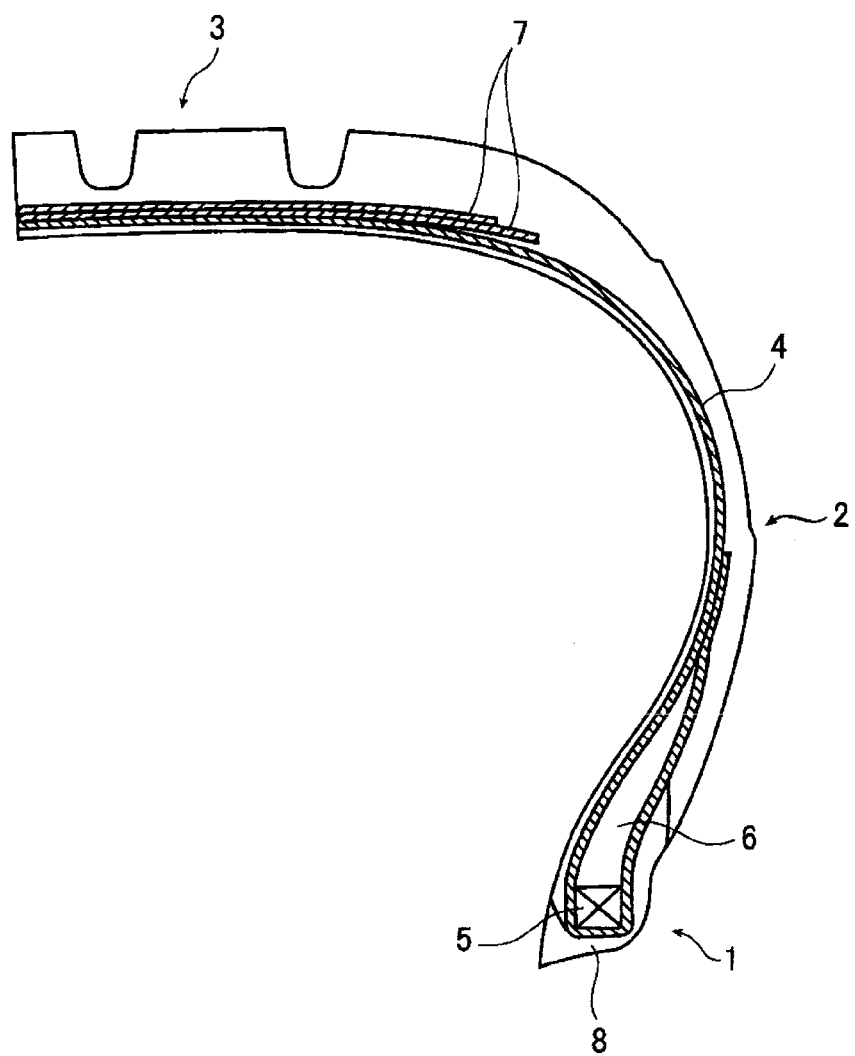

RUBBER COMPOSITION AND PNEUMATIC TIRE

TECHNICAL FIELD

The present invention relates to a rubber composition and a pneumatic tire.

BACKGROUND ART

As a method for improving the wet performance of a tire and reducing the rolling resistance thereof, the use of a rubber composition including silica has been known. Moreover, from the viewpoint of further improving the performance, a rubber composition including a silane coupling agent together with silica has been known.

When a silane coupling agent is mixed with a composition including silica, the following problems are caused: insufficient coupling reaction (silanization) between the silica and the silane coupling agent would interrupt favorable dispersion of silica; and excessive coupling reaction would deteriorate the quality (especially reinforcing property) due to scorching.

In view of the above problems, the present applicant has suggested the following rubber composition in Patent Literature 1. That is, the rubber composition includes 5 to 30 parts by weight of calcium carbonate with a mean particle diameter of 1 to 100 nm based on 100 parts by weight of diene-based rubber containing styrene-butadiene copolymer rubber, the total amount of the calcium carbonate and silica being 30 to 120 parts by weight; 1 to 15 wt % sulfur-containing silane coupling agent based on the total amount of the silica and the calcium carbonate; and 1 to 15 wt % secondary or tertiary aliphatic amine based on the total amount of the silica and the calcium carbonate.

Moreover, the present applicant has suggested the following rubber composition in Patent Literature 2. That is, the rubber composition includes 100 parts by weight of diene-based rubber; 20 to 120 parts by weight of silica; 3 to 15 wt % sulfur-containing silane coupling agent to the silica; 1,5-diazabicyclo[4,3,0]nonene-5 (DBN) having the formula (I):

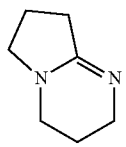

(I)

and/or its salt.

Further, the present applicant has suggested the following rubber composition in Patent Literature 3. That is, the rubber composition includes 100 parts by weight of diene-based rubber; 20 to 120 parts by weight of silica; 3 to 15 wt % sulfur-containing silane coupling agent to the silica weight; 0.1 to 3.0 parts by weight of a compound having a piperidine skeleton represented by the formula (I) (or its salt) and/or the formula (II):

(wherein n represents 3 or 5.)

(wherein $R^1$ represents CH or N, and $R^2$ represents H or OH when $R^1$ represents CH and represents H when $R^1$ represents N.);

and a melamine derivative represented by the formula (III):

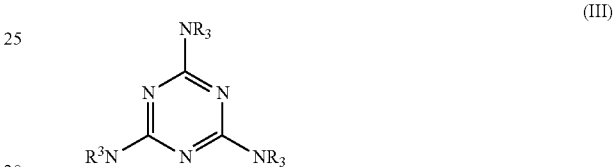

(wherein $R^3$ represents a methoxy methyl group (—$CH_2OCH_3$) or a methylol group (—$CH_2OH$), and the number of methoxy methyl groups is 3 to 6 and the number of methylol groups is 0 to 3.)
and/or polymer or copolymer resin of those.

CITATION LIST

Patent Literatures

Patent Literature 1: JP-A-2007-99896
Patent Literature 2: JP-A-2009-256439
Patent Literature 3: JP-A-2009-263584

DISCLOSURE OF THE INVENTION

Problems to be Solved by the Invention

Therefore, an object of the present invention is to provide a rubber composition for a tire, which achieves production of a tire having improved dispersibility of silica, excellent wet performance, and excellent rolling resistance and showing a suppressed decrease in reinforcing property, in a manner similar to Patent Literatures 1 to 3.

Solutions to the Problems

As a result of concerted studies for solving the above problems, the present inventors have found out that by the use of a rubber composition including indole, indigo, and derivatives thereof, a tire having improved dispersibility of silica, excellent wet performance, and excellent rolling resistance and showing a suppressed decrease in reinforcing property can be produced, and thus has completed the present invention.

That is, the present invention provides the following (1) to (5):

(1) A rubber composition including diene-based rubber, silica, a sulfur-containing silane coupling agent, and an amine compound, wherein the amine compound is a compound represented by the following formula (I) and/or the following formula (II);

the content of the silica is 20 to 120 parts by mass based on 100 parts by mass of the diene-based rubber;

the content of the sulfur-containing silane coupling agent is 3 to 15 parts by mass based on 100 parts by mass of the silica; and the content of the amine compound is 0.5 to 20 parts by mass based on 100 parts by mass of the silica:

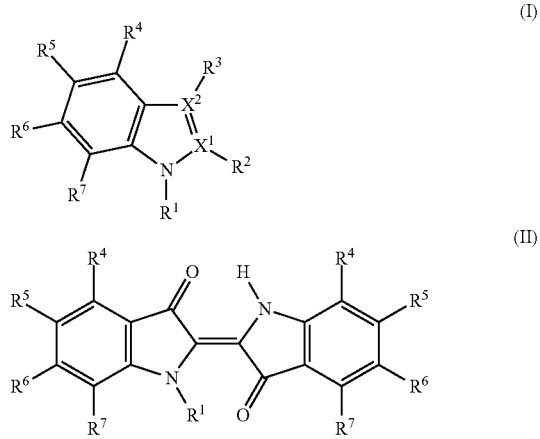

(wherein $X^1$ and $X^2$ each independently represents a carbon atom or a nitrogen atom, $R^1$ to $R^3$ each independently represents a hydrogen atom, an alkyl group, an alkoxycarbonyl group, or a phenyl group which may have a substituent, $R^4$ to $R^7$ each independently represents a hydrogen atom, a fluorine atom, a chlorine atom, an alkyl group, or an alkoxy group, provided that, when $X^1$ is a nitrogen atom, $R^2$ is absent; when $X^2$ is a nitrogen atom, $R^3$ is absent.).

(2) The rubber composition according to the above (1), wherein the compound represented by the above formula (I) is a compound represented by any of the following formulae (I-a) to (I-d):

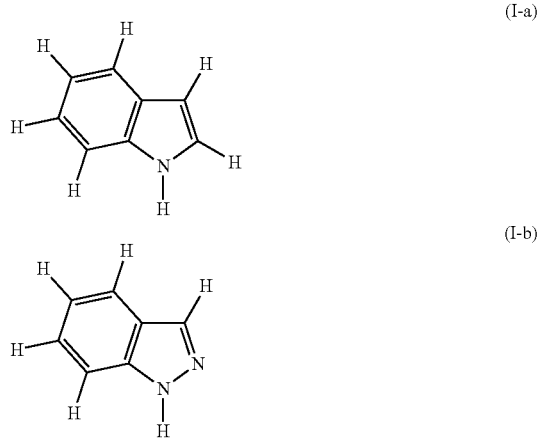

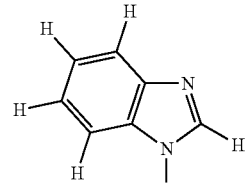

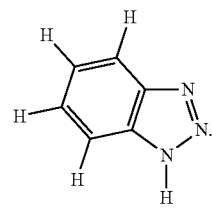

(3) The rubber composition according to the above (1) or (2), wherein the compound represented by the above formula (II) is a compound represented by the following formula (II-a):

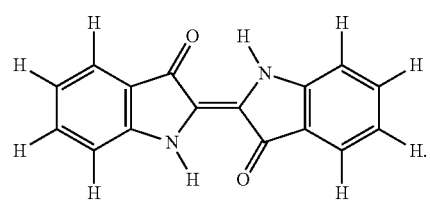

(4) A pneumatic tire including the rubber composition according to any of the above (1) to (3).

(5) A pneumatic tire including the rubber composition according to any of the above (1) to (3) in a tire tread.

Effects of the Invention

As described below, the present invention can provide a rubber composition for a tire, which can produce a tire having improved dispersibility of silica, excellent wet performance, and excellent rolling resistance and showing a suppressed decrease in reinforcing property.

The object, feature, aspect, and advantage of the present invention will be clarified with the following detailed description and attached drawings.

BRIEF DESCRIPTION OF THE DRAWING

FIG. 1 is a partial schematic sectional view of a tire, which depicts an example of an embodiment of the tire according to the present invention.

DESCRIPTION OF EMBODIMENTS

[Rubber Composition for Tire]

A rubber composition for a tire according to the present invention (hereinafter also referred to as a "rubber composition of the present invention" simply) contains diene-based rubber, silica, a sulfur-containing silane coupling agent, and an amine compound. The amine compound is a compound represented by the above formula (I) and/or the above formula (II). The content of the silica is 20 to 120 parts by mass based on 100 parts by mass of the diene-based rubber. The content of the sulfur-containing silane coupling agent is 3 to 15 parts by mass based on 100 parts by mass of the silica. The content of the amine compound is 0.5 to 20 parts by mass based on 100 parts by mass of the silica.

The details of components contained in the rubber composition of the present invention will be hereinafter described.

<Diene-Based Rubber>

There is no particular limitation on the diene-based rubber contained in the rubber composition of the present invention as long as a main chain includes a double bond. Specific examples of the diene-based rubber include natural rubber (NR), isoprene rubber (IR), styrene-butadiene rubber (SBR), butadiene rubber (BR), chloroprene rubber (CR), acrylonitrile butadiene rubber (NBR), ethylene-propylene-diene copolymer rubber (EPDM), styrene-isoprene rubber, isoprene-butadiene rubber, nitrile rubber, and hydrogenated nitrile rubber. Any of those kinds of diene-based rubber may be used alone, or two or more kinds thereof may be used in combination.

Among these, styrene-butadiene rubber (SBR) or butadiene rubber (BR) is preferably used because of having excellent balance between the reinforcing property and the wet performance of the obtained tire. More preferably, styrene-butadiene rubber (SBR) and butadiene rubber (BR) are used in combination.

<Silica>

There is no particular limitation on the silica contained in the rubber composition of the present invention. Conventionally known silica included in a rubber composition in the application of tires or the like can be used.

Specific examples of the silica include fumed silica, fired silica, precipitated silica, crushed silica, molten silica, and colloidal silica. Any of those kinds of silica may be used alone, or two or more kinds thereof may be used in combination.

In the present invention, the content of the silica is 20 to 120 parts by mass based on 100 parts by mass of the diene-based rubber. For improving the strength and wear resistance of the obtained tire, the content of the silica is more preferably 40 to 100 parts by mass.

<Sulfur-Containing Silane Coupling Agent>

There is no particular limitation on the sulfur-containing silane coupling agent contained in the rubber composition of the present invention. As the sulfur-containing silane coupling agent, a conventionally known silane coupling agent included in a rubber composition in the application of tires or the like can be used.

Specific examples of the silane coupling agent include 3-trimethoxysilylpropyl-N, N-dimethylthiocarbamoyl-tetrasulfide, trimethoxysilylpropyl-mercaptobenzothiazoletetrasulfide, triethoxysilylpropyl-methacrylate-monosulfide, dimethoxymethylsilylpropyl-N,N-dimethylthiocarbamoyl-tetrasulfide, bis-[3-(triethoxysilyl)-propyl]tetrasulfide, bis-[3-(trimethoxysilyl)-propyl]tetrasulfide, bis[3-(triethoxysilyl)-propyl]disulfide, 3-mercaptopropyl-trimethoxysilane, and 3-mercaptopropyl-triethoxysilane. Any of these silane coupling agents may be used alone, or two or more kinds thereof may be used in combination.

In the present invention, the content of the sulfur-containing silane coupling agent is 3 to 15 pasts by mass based on 100 parts by mass of the silica. For improving the physical properties of the rubber composition of the present invention, such as tensile strength after vulcanization and extension at break, the content of the sulfur-containing silane coupling agent is more preferably 5 to 10 parts by mass.

<Amine Compound>

The amine compound contained in the rubber composition of the present invention is a mixture agent added from the viewpoint of promoting coupling reaction (silanization) between the aforementioned silica and the silane coupling agent. The amine compound is represented by the following (I) and/or (II):

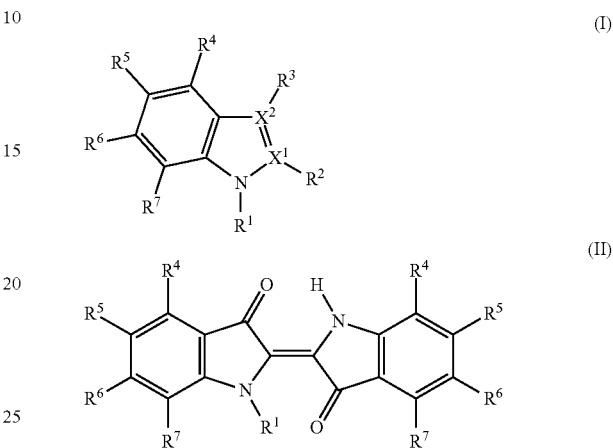

(wherein $X^1$ and $X^2$ each independently represents a carbon atom or a nitrogen atom, $R^1$ to $R^3$ each independently represents a hydrogen atom, an alkyl group, an alkoxycarbonyl group or a phenyl group which may have a substituent, $R^4$ to $R^7$ each independently represents a hydrogen atom, a fluorine atom, a chlorine atom, an alkyl group, or an alkoxy group. However, when $X^1$ is a nitrogen atom, $R^2$ is absent; when $X^2$ is a nitrogen atom, $R^3$ is absent.).

The alkyl group as one of $R^1$ to $R^3$ may be a linear, branched, or annular alkyl group with a carbon number of 1 to 6. More specifically, examples of the alkyl group include a methyl group, an ethyl group, a n-propyl group, an i-propyl group, a n-butyl group, a i-butyl group, a s-butyl group, a t-butyl group, a n-pentyl group, an i-amyl group, a sec-amyl group, a tert-amyl group, a neopentyl group, a cyclopentyl group, a n-hexyl group, and a cyclohexyl group.

Specific examples of the alkoxycarbonyl group as one of $R^1$ to $R^3$ include a methoxycarbonyl group, an ethoxycarbonyl group, a n-propyloxycarbonyl group, an i-propyloxycarbonyl group, a n-butoxycarbonyl group, a sec-butoxycarbonyl group, and a tert-butoxycarbonyl group.

Moreover, specific examples of the phenyl group which may have a substituent as one of $R^1$ to $R^3$ include a phenyl group, a 2-fluorophenyl group, a 3-fluorophenyl group, a 4-fluorophenyl group, a 2-chlorophenyl group, a 3-chlorophenyl group, a 4-chlorophenyl group, a 2-bromophenyl group, a 3-bromophenyl group, a 4-bromophenyl group, a 4-iodophenyl group, a 2,4-dichlorophenyl group, a 3,4-dichlorophenyl group, a 2,6-difluorophenyl group, a 2,6-dichlorophenyl group, a 2-fluoro-4-chlorophenyl group, a 2,3,4,5,6-pentafluorophenyl group, a 2-cyanophenyl group, a 3-cyanophenyl group, a 4-cyanophenyl group, a 2-methylphenyl group, a 3-methylphenyl group, a 4-methylphenyl group, a 2,5-dimethylphenyl group, a 4-methyl-2,3,5,6-tetrafluorophenyl group, a 2-methoxyphenyl group, a 3-methoxyphenyl group, a 4-methoxyphenyl group, a 2,6-dimethoxyphenyl group, a 3,4-dimethoxyphenyl group, a 3,4,5-trimethoxyphenyl group, a 2-chloro-4-methylphenyl group, a 3-bromo-5-methylphenyl group, a 2-methyl-5-fluorophenyl group, and a 2-chloro-3-cyanophenyl group.

On the other hand, a preferable example of the alkyl group as one of $R^4$ to $R^7$ is a methyl group. Moreover, a preferable example of the alkoxy group as one of $R^4$ to $R^7$ is a methoxy group.

In the present invention, a compound represented by any of the following formulae (I-a) to (I-d) is given as a preferable example of the compound represented by the above formula (I). Among these compounds, a compound (indole) represented by the following formula (I-a), which is a naturally derived compound, is preferable.

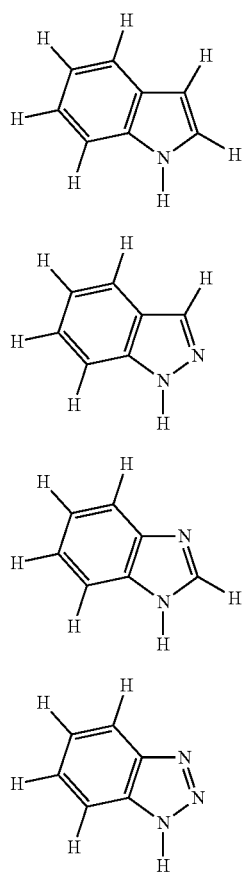

(I-a)

(I-b)

(I-c)

(I-d)

In the present invention, a compound represented by the following formula (II-a) is given as a preferable example of the compound represented by the above formula (II) because the compound is naturally derived.

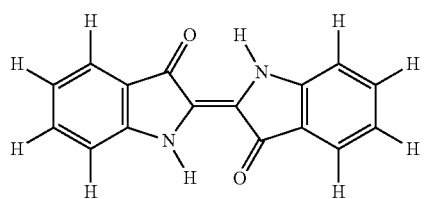

(II-a)

In the present invention, the use of the rubber composition including the above amine compound enables the production of a tire having improved dispersibility of silica, excellent wet performance, and excellent rolling resistance and showing a suppressed decrease in reinforcing property.

It is considered that this is because the hydrolysis of the sulfur-containing silane coupling agent progresses to promote the coupling reaction (silanization) between the silane coupling agent and the silica.

Moreover, in the present invention, the content of the amine compound is 0.5 to 20 parts by mass based on 100 parts by mass of the silica. For favorably keeping the vulcanization speed of the rubber composition of the present invention to be obtained, the content of the amine compound is more preferably 0.5 to 10 parts by mass.

The rubber composition according to the present invention can include filler (such as carbon black) other than silica, in addition to the aforementioned components. The rubber composition of the present invention can include various kinds of additives generally used in rubber compositions for a tire, such as a vulcanizing agent or cross-linking agent, a vulcanization promoting agent or cross-linking promoting agent, zinc oxide, oil, an aging-preventing agent, and a plasticizing agent. The amount of these additives to be contained may be a conventional general amount to be contained without departing from the purpose of the present invention.

A method for manufacturing the rubber composition of the present invention is not particularly limited. For kneading the components described above, a known method such as a method of kneading the components using a device (for example, a Banbury mixer, a kneader, or a roller) is given.

Here, in the rubber composition of the present invention, the aforementioned amine compound needs to be contained before the coupling reaction (silanization) between the silica and the silane coupling agent. Therefore, the addition of the amine compound is preferably performed at the same time as the addition of the silica and the silane coupling agent.

Moreover, the rubber composition of the present invention can be vulcanized or cross-linked under a conventionally known vulcanizing or cross-linking condition.

[Tire]

A "pneumatic tire" according to the present invention (hereinafter also simply referred to as the "inventive tire") is a pneumatic tire including the aforementioned rubber composition of the present invention.

FIG. 1 is a partial schematic sectional view of a tire, which depicts an example of an embodiment of the tire according to the present invention. However, the tire according to the present invention is not limited to the embodiment depicted in FIG. 1.

In FIG. 1, reference symbol 1 denotes a bead, reference symbol 2 denotes a sidewall, and reference symbol 3 denotes a tire tread.

A carcass layer 4 having a fiber cord embedded is extended between a pair of right and left beads 1. An end of this carcass layer 4 is wound around a bead core 5 and a bead filler 6 in a manner that the end is folded from the inside to the outside of the tire.

In the tire tread 3, a belt layer 7 is disposed outside the carcass layer 4 around the entire periphery of the tire.

At a part of the bead 1 that is in contact with a rim, a rim cushion 8 is disposed.

The inventive tire can be produced in the following manner, for example. That is, vulcanization or cross-linking is performed at temperature according to the kind and mixture proportion of the diene-based rubber, the vulcanizing or cross-linking agent, or the vulcanizing promoting or cross-linking promoting agent contained in the rubber composition of the present invention, thereby forming the tread, the sidewall, and the like.

In the present invention, from the viewpoint of taking advantage of the effect of the present invention which provides improved dispersibility of silica, excellent wet performance and rolling resistance, and suppresses a decrease in reinforcing property, the tire tread containing more silica than the other components is preferably formed using the rubber component of the present invention.

EXAMPLES

The present invention is hereinafter described with reference to examples; however, the present invention is not limited thereto.

Examples 1 to 14 and Comparative Examples 1 to 6

The components indicated in Table 1 below were mixed at proportions (parts by mass) indicated in Table 1 below.

Specifically, first, the components indicated in Table 1 other than sulfur and the vulcanizing promoting agent were kneaded for 9 minutes using a hermetic mixer of 1.5 liter content, and then released when the temperature reached 150° C., thereby providing a master batch.

Next, the obtained master batch was kneaded with sulfur and the vulcanizing promoting agent using an open roller, thereby providing a rubber composition.

Then, the obtained rubber composition was vulcanized in a mold (15 cm×15 cm×0.2 cm) at 160° C. for 30 minutes, thereby producing a vulcanized rubber sheet.

<Tan δ(0° C.) (Index of Wet Performance)>

The obtained vulcanized rubber sheet was subjected to tan δ measurement using a viscoelastic spectrometer (manufactured by Toyo Seiki Seisaku-sho, Ltd.) in accordance with JIS K6394:2007 under conditions of an initial distortion of 10%, an amplitude of ±2%, a frequency of 20 Hz, and a temperature of 0° C.

The obtained results are expressed with indexes assuming the value of Comparative Example 1 as 100, and are shown in Table 1 below. As this index is larger, tan δ is larger. In other words, as this index is larger, the wet grip performance is more excellent.

<Tan δ(60° C.) (Index of Rolling Resistance)>

The obtained vulcanized rubber sheet was subjected to tan δ measurement using a viscoelastic spectrometer (manufactured by Toyo Seiki Seisaku-sho, Ltd.) in accordance with JIS K6394:2007 under conditions of an initial distortion of 10%, an amplitude of ±2%, a frequency of 20 Hz, and a temperature of 60° C.

The obtained results are expressed with indexes assuming the value of Comparative Example 1 as 100, and are shown in Table 1 below. As this index is smaller, tan δ is smaller and the rolling resistance is more excellent (smaller).

<Tensile Strength at Break ($TS_B$) (Index of Reinforcing Property)>

A JIS Type 3 dumbbell-like test piece was obtained by punching the obtained vulcanized rubber sheet, and the tensile stress at break ($TS_B$) [MPa] thereof was measured at room temperature in a manner that a tensile test was performed at a tensile speed of 500 mm/minute in accordance with JIS K6251:2004.

The obtained results are expressed with indexes assuming the value of Comparative Example 1 as 100, and are shown in Table 1 below. As this index is larger, the stress is larger and the reinforcing property is more excellent.

<Bound Rubber (Index of Silica Dispersibility)>

The master batch obtained at the time of preparing the rubber composition was shredded and immersed in toluene for 48 hours. After the immersion, a part thereof that was not dissolved into toluene was air-dried and the mass thereof was measured.

The ratio (bound rubber) of the mass of the rubber content in the part that was not dissolved into toluene (the mass of the product obtained by subtracting silica from the part that was not dissolved into toluene) to the mass of rubber in the master batch (the mass obtained by multiplying the mass of the master batch by the content of the rubber) was calculated.

The calculated results were expressed as indexes in Table 1 below with the value of Comparative Example 1 assumed as 100. As this index is larger, the dispersibility is improved. This is because the bound rubber is larger as this index is larger, thereby preventing the aggregation of silica.

TABLE 1

(No. 1)

| | Example | | | | | | | Comparative Example | | | |
|---|---|---|---|---|---|---|---|---|---|---|---|
| | 1 | 2 | 3 | 4 | 5 | 6 | 7 | 1 | 2 | 3 | 4 |
| styrene-butadiene rubber (rubber content) | 103.1 (75) | 103.1 (75) | 103.1 (75) | 103.1 (75) | 103.1 (75) | 103.1 (75) | 103.1 (75) | 103.1 (75) | 103.1 (75) | 103.1 (75) | 103.1 (75) |
| butadiene rubber | 25 | 25 | 25 | 25 | 25 | 25 | 25 | 25 | 25 | 25 | 25 |
| silica | 80 | 80 | 80 | 80 | 80 | 80 | 80 | 80 | 80 | 80 | 80 |
| silane coupling agent (amount based on 100 parts by mass of silica) | 6.4 (8.0) | 6.4 (8.0) | 6.4 (8.0) | 6.4 (8.0) | 6.4 (8.0) | 6.4 (8.0) | 6.4 (8.0) | 6.4 (8.0) | 6.4 (8.0) | 6.4 (8.0) | 6.4 (8.0) |
| amine compound 1 (amount based on 100 parts by mass of silica) | 0.5 (0.6) | 1.0 (1.3) | 2.0 (2.5) | 4.0 (5.0) | 6.0 (7.5) | 8.0 (10.0) | 12.0 (15.0) | — | 0.05 (0.06) | 18.0 (22.5) | — |
| amine compound X (amount based on 100 parts by mass of silica) | — | — | — | — | — | — | — | — | — | — | 2.0 (2.5) |
| oil | 14.4 | 14.4 | 14.4 | 14.4 | 14.4 | 14.4 | 14.4 | 14.4 | 14.4 | 14.4 | 14.4 |
| zinc oxide | 2.5 | 2.5 | 2.5 | 2.5 | 2.5 | 2.5 | 2.5 | 2.5 | 2.5 | 2.5 | 2.5 |
| stearic acid | 2.5 | 2.5 | 2.5 | 2.5 | 2.5 | 2.5 | 2.5 | 2.5 | 2.5 | 2.5 | 2.5 |
| sulfur | 1.4 | 1.4 | 1.4 | 1.4 | 1.4 | 1.4 | 1.4 | 1.4 | 1.4 | 1.4 | 1.4 |
| vulcanization promoting agent 1 | 1.7 | 1.7 | 1.7 | 1.7 | 1.7 | 1.7 | 1.7 | 1.7 | 1.7 | 1.7 | 1.7 |
| vulcanization promoting agent 2 | 2.0 | 2.0 | 2.0 | 2.0 | 2.0 | 2.0 | 2.0 | 2.0 | 2.0 | 2.0 | 2.0 |
| tanδ (0° C.) | 100 | 101 | 102 | 104 | 105 | 105 | 105 | 100 | 100 | 105 | 99 |
| tanδ (60° C.) | 99 | 99 | 98 | 97 | 97 | 96 | 96 | 100 | 100 | 95 | 101 |

TABLE 1-continued (No. 1)

|  | Example | | | | | | | Comparative Example | | | |
|---|---|---|---|---|---|---|---|---|---|---|---|
|  | 1 | 2 | 3 | 4 | 5 | 6 | 7 | 1 | 2 | 3 | 4 |
| tensile stress (TS$_B$) | 102 | 105 | 108 | 109 | 110 | 111 | 112 | 100 | 101 | 98 | 98 |
| bound rubber | 101 | 102 | 103 | 104 | 104 | 104 | 104 | 100 | 101 | 104 | 96 |

TABLE 2

(No. 2)

|  | Example | | | | | | | Comparative Example | | |
|---|---|---|---|---|---|---|---|---|---|---|
|  | 8 | 9 | 10 | 11 | 12 | 13 | 14 | 1 | 5 | 6 |
| styrene-butadiene rubber (rubber content) | 103.1 (75) | 103.1 (75) | 103.1 (75) | 103.1 (75) | 103.1 (75) | 103.1 (75) | 103.1 (75) | 103.1 (75) | 103.1 (75) | 103.1 (75) |
| butadiene rubber | 25 | 25 | 25 | 25 | 25 | 25 | 25 | 25 | 25 | 25 |
| silica | 80 | 80 | 80 | 80 | 80 | 80 | 80 | 80 | 80 | 80 |
| silane coupling agent (amount based on 100 parts by mass of silica) | 6.4 (8.0) | 6.4 (8.0) | 6.4 (8.0) | 6.4 (8.0) | 6.4 (8.0) | 6.4 (8.0) | 6.4 (8.0) | 6.4 (8.0) | 6.4 (8.0) | 6.4 (8.0) |
| amine compound 2 (amount based on 100 parts by mass of silica) | 0.5 (0.6) | 1.0 (1.3) | 2.0 (2.5) | 4.0 (5.0) | 6.0 (7.5) | 8.0 (10.0) | 12.0 (15.0) | — | 0.05 (0.06) | 18.0 (22.5) |
| oil | 14.4 | 14.4 | 14.4 | 14.4 | 14.4 | 14.4 | 14.4 | 14.4 | 14.4 | 14.4 |
| zinc oxide | 2.5 | 2.5 | 2.5 | 2.5 | 2.5 | 2.5 | 2.5 | 2.5 | 2.5 | 2.5 |
| stearic acid | 2.5 | 2.5 | 2.5 | 2.5 | 2.5 | 2.5 | 2.5 | 2.5 | 2.5 | 2.5 |
| sulfur | 1.4 | 1.4 | 1.4 | 1.4 | 1.4 | 1.4 | 1.4 | 1.4 | 1.4 | 1.4 |
| vulcanization promoting agent 1 | 1.7 | 1.7 | 1.7 | 1.7 | 1.7 | 1.7 | 1.7 | 1.7 | 1.7 | 1.7 |
| vulcanization promoting agent 2 | 2.0 | 2.0 | 2.0 | 2.0 | 2.0 | 2.0 | 2.0 | 2.0 | 2.0 | 2.0 |
| tanδ (0° C.) | 101 | 102 | 103 | 104 | 105 | 105 | 105 | 100 | 101 | 105 |
| tanδ (60° C.) | 99 | 95 | 90 | 88 | 87 | 86 | 86 | 100 | 100 | 85 |
| tensile stress (TS$_B$) | 102 | 105 | 109 | 111 | 112 | 113 | 113 | 100 | 101 | 97 |
| bound rubber | 102 | 104 | 107 | 108 | 109 | 110 | 111 | 100 | 101 | 111 |

As the components in Table 1 above, the following were used:
  styrene-butadiene rubber: VSL-5025 HM-1 (Oil extended, 75 parts by mass of rubber content in 103.1 parts by mass of styrene-butadiene rubber, manufactured by LANXCESS);
  butadiene rubber: Nippol BR 1220 (manufactured by ZEON CORPORATION);
  silica: Zeosil 1165MP (manufactured by Rhodia);
  silane coupling agent: Si69 (manufactured by Degussa);
  oil: Process X-140 (manufactured by Japan Energy Corporation);
  zinc oxide: three kinds of flowers of zinc (manufactured by Seido Chemical Industry Co., Ltd);
  stearic acid: beads stearic acid YR (manufactured by NOF CORPORATION);
  sulfur: oil-processed sulfur (sulfur content is 1.1 parts by mass in 1.4 parts by mass thereof, manufactured by Hosoi Chemical Industry Co., Ltd.);
  vulcanization promoting agent 1: N-cyclohexyl-2-benzothiazolylsulfeneamide (Nocceler CZ-G, manufactured by OUCHI SHINKO CHEMICAL INDUSTRIAL CO., LTD.);
  vulcanization promoting agent 2: 1,3-diphenylguanidine (Nocceler DPG, manufactured by OUCHI SHINKO CHEMICAL INDUSTRIAL CO., LTD.);
  amine compound 1: indole represented by the above formula (I-a);
  amine compound 2: indigo represented by the above formula (II-a); and
  amine compound X: 2-amino-3-(indolyl)propionate (tryptophan).

From the results shown in Table 1, it was indicated that the rubber compositions according to Examples 1 to 14 prepared by mixing a predetermined amount of indole or indigo can produce a tire having improved dispersibility of silica, excellent wet performance and rolling resistance, and showing a suppressed decrease in reinforcing property as compared with the rubber composition according to Comparative Example 1 prepared without mixing any of those.

Meanwhile, the improvement effects as much as that of the rubber composition of Comparative Example 1 were hardly observed in the rubber compositions according to Comparative Examples 2 and 5 which were prepared by mixing a small amount of indole or indigo. Therefore, it was clarified that the reinforcing property of the rubber compositions of Comparative Examples 3 and 6 prepared by mixing a large amount of indole or indigo was poorer than that of the rubber composition of Comparative Example 1.

Further, it was confirmed that there were no improvement effects in any physical property of the composition of Comparative Example 4 prepared by mixing tryptophan as another amine compound. Accordingly, it was found out that the amine compound used in the present invention having a similar configuration has unpredictable properties.

This application is based on Japanese Patent Application No. 2010-232602 filed with the Japan Patent Office on Oct. 15, 2010 by the present applicant, the entire content of which is hereby incorporated by reference.

The foregoing detailed description on the particular embodiment of the present invention has been presented for the purposes of illustration. It is not intended to be exhaustive or to limit the subject matter described herein to the precise form disclosed. It is apparent to the skilled in the art that various modifications or alterations can be made in light of the content of the description.

DESCRIPTION OF REFERENCE SIGNS

1 BEAD
2 SIDEWALL
3 TIRE TREAD
4 CARCASS LAYER
5 BEAD CORE
6 BEAD FILLER
7 BELT LAYER
8 RIM CUSHION

The invention claimed is:

1. A rubber composition comprising diene-based rubber, silica, a sulfur-containing silane coupling agent, and an amine compound, wherein
the amine compound is a compound represented by the following formula (I) and/or the following formula (II);
the content of the silica is 20 to 120 parts by mass based on 100 parts by mass of the diene-based rubber;
the content of the sulfur-containing silane coupling agent is 3 to 15 parts by mass based on 100 parts by mass of the silica; and
the content of the amine compound is 0.5 to 20 parts by mass based on 100 parts by mass of the silica:

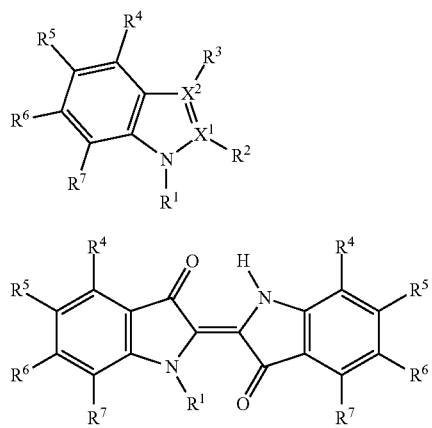

wherein $X^1$ and $X^2$ represent a carbon atom, $X^1$ represents a nitrogen atom and $X^2$ represents a carbon atom, or $X^1$ represents a carbon atom and $X^2$ represents a nitrogen atom;
$R^1$ to $R^3$ each independently represents a hydrogen atom, an alkyl group, an alkoxycarbonyl group or a phenyl group which may have a substituent; and
$R^4$ to $R^2$ each independently represents a hydrogen atom, a fluorine atom, a chlorine atom, an alkyl group, or an alkoxy group,
provided that, when $X^1$ is a nitrogen atom, $R^2$ is absent; when $X^2$ is a nitrogen atom, $R^3$ is absent.

2. The rubber composition according to claim 1, wherein the diene-based rubber is at least one selected from the group consisting of natural rubber (NR), isoprene rubber (IR), styrene-butadiene rubber (SBR), butadiene rubber (BR), chloroprene rubber (CR), acrylonitrile butadiene rubber (NBR), ethylene-propylene-diene copolymer rubber (EPDM), styrene-isoprene rubber, isoprene-butadiene rubber, nitrile rubber, and hydrogenated nitrile rubber.

3. The rubber composition according to claim 1, wherein the silica is at least one selected from the group consisting of fumed silica, fired silica, precipitated silica, crushed silica, molten silica, and colloidal silica.

4. The rubber composition according to claim 1, wherein the content of the silica is 40 to 100 parts by mass.

5. The rubber composition according to claim 1, wherein the content of the sulfur-containing silane coupling agent is 5 to 10 parts by mass.

6. The rubber composition according to claim 1, wherein the content of the amine compound is more preferably 0.5 to 10 parts by mass.

7. The rubber composition according to claim 1, wherein the sulfur-containing silane coupling agent is at least one selected from the group consisting of 3-trimethoxysilylpropyl-N, N-dimethylthiocarbamoyl-tetrasulfide, trimethoxysilylpropyl-mercaptobenzothiazoletetrasulfide, triethoxysilylpropyl-methacrylate-monosulfide, dimethoxymethylsilylpropyl-N,N-dimethylthiocarbamoyl-tetrasulfide, bis-[3-(triethoxysilyl)-propyl]tetrasulfide, bis-[3-(trimethoxysilyl)-propyl]tetrasulfide, bis-[3-(triethoxysilyl)-propyl]disulfide, 3-mercaptopropyl-trimethoxysilane, and 3-mercaptopropyl-triethoxysilane.

8. The rubber composition according to claim 1, wherein the alkyl group is a methyl group.

9. The rubber composition according to claim 1, wherein the alkoxy group is a methoxy group.

10. The rubber composition according to claim 1, wherein the compound represented by the above formula (I) is a compound represented by any of the following formulae (I-a) to (I-c):

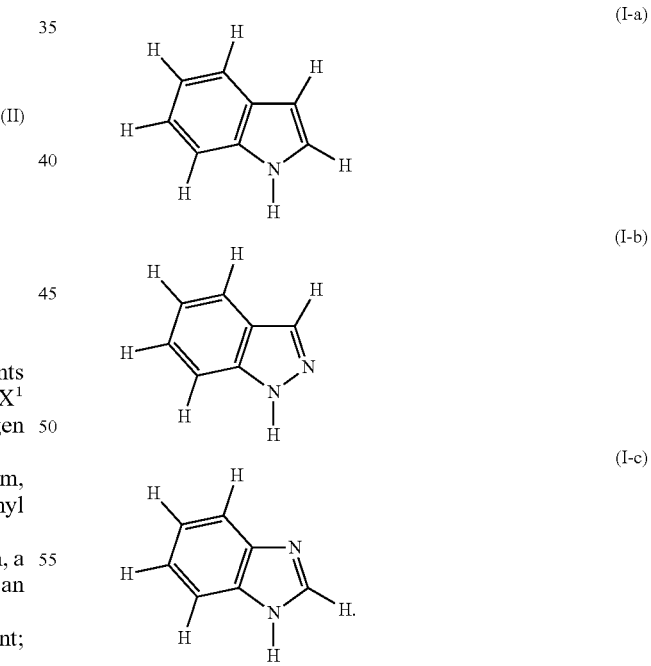

11. A rubber composition comprising diene-based rubber, silica, a sulfur-containing silane coupling agent, and an amine compound, wherein
the amine compound is a compound represented by the following formula (II-a);
the content of the silica is 20 to 120 parts by mass based on 100 parts by mass of the diene-based rubber;

the content of the sulfur-containing silane coupling agent is 3 to 15 parts by mass based on 100 parts by mass of the silica; and the content of the amine compound is 0.5 to 20 parts by mass based on 100 parts by mass of the silica:

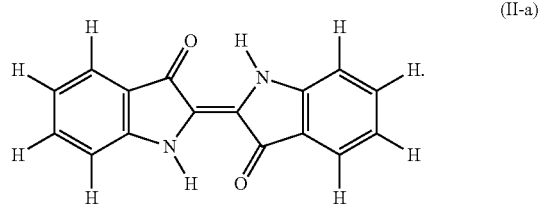 [SMILES: O=C1/C(=C2\Nc3ccccc3C2=O)Nc2ccccc21]

(II-a)

12. The rubber composition according to claim 1, further comprising an additional filler other than silica.

13. The rubber composition according to claim 12, wherein the filler is carbon black.

14. The rubber composition according to claim 1, wherein a coupling reaction occurs between the silica and the silane coupling agent, and the amine compound is contained before the coupling reaction.

15. A pneumatic tire comprising the rubber composition according to claim 1.

16. A pneumatic tire comprising the rubber composition according to claim 1 in at least a tire tread.

17. The rubber composition according to claim 10, wherein the compound represented by the above formula (I) is the compound represented by the formulae (I-a).

18. The rubber composition according to claim 10, wherein the compound represented by the above formula (I) is the compound represented by the formulae (I-b).

19. The rubber composition according to claim 10, wherein the compound represented by the above formula (I) is the compound represented by the formulae (I-c).

20. A rubber composition comprising;
diene-based rubber,
silica,
a sulfur-containing silane coupling agent,
an amine compound, and
optionally carbon black,
wherein the content of the silica is 20 to 120 parts by mass based on 100 parts by mass of the diene-based rubber;
the content of the sulfur-containing silane coupling agent is 3 to 15 parts by mass based on 100 parts by mass of the silica;
the content of the amine compound is 0.5 to 20 parts by mass based on 100 parts by mass of the silica; and
the amine compound is a compound represented by the following formula (II):

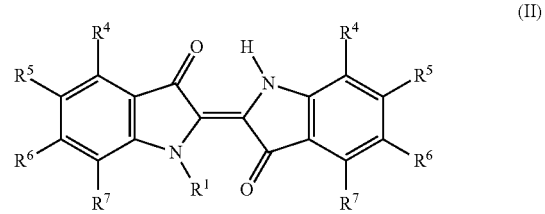

(II)

wherein $R^1$ represents a hydrogen atom, an alkyl group, an alkoxycarbonyl group or a phenyl group which may have a substituent; and $R^4$ to $R^7$ each independently represents a hydrogen atom, a fluorine atom, a chlorine atom, an alkyl group, or an alkoxy group.

* * * * *